United States Patent
Lee

(10) Patent No.: US 8,607,097 B2
(45) Date of Patent: Dec. 10, 2013

(54) APPARATUS AND METHOD FOR PREVENTING ABNORMAL ROM UPDATE IN PORTABLE TERMINAL

(75) Inventor: Yong-Jae Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 276 days.

(21) Appl. No.: 13/093,022

(22) Filed: Apr. 25, 2011

(65) Prior Publication Data

US 2011/0276835 A1  Nov. 10, 2011

(30) Foreign Application Priority Data

May 10, 2010  (KR) .................. 10-2010-0043341

(51) Int. Cl.
*G06F 11/00* (2006.01)
(52) U.S. Cl.
USPC .......................................... 714/36

(58) Field of Classification Search
USPC .......................................... 714/36
See application file for complete search history.

(56) References Cited

U.S. PATENT DOCUMENTS

| 4,322,613 A * | 3/1982 | Oldenkamp ............ 235/449 |
| 2004/0003265 A1 * | 1/2004 | Freeman et al. ........... 713/191 |
| 2007/0220372 A1 * | 9/2007 | Chen .................... 714/52 |
| 2008/0026836 A1 * | 1/2008 | Kubota et al. ............ 463/29 |

* cited by examiner

*Primary Examiner* — Michael Maskulinski
*Assistant Examiner* — Neil Miles
(74) *Attorney, Agent, or Firm* — Cha & Reiter, LLC

(57) ABSTRACT

An apparatus and method for determining an abnormal ROM update in a portable terminal. The apparatus includes a ROM update unit for increasing a value of an update start counter when a ROM update process is performed, and increasing a value of an update finish counter when the ROM update process is finished. The ROM update unit loads the values of the update start counter and the update finish counter, and compares the values of the two counters to determine that the ROM update process has been normally performed before the portable terminal abnormally operates.

11 Claims, 4 Drawing Sheets

APPARATUS AND METHOD FOR PREVENTING ABNORMAL ROM UPDATE IN PORTABLE TERMINAL

CLAIM OF PRIORITY

This application claims priority under 35 U.S.C. §119 from an application filed in the Korean Intellectual Property Office on May 10, 2010 and assigned Ser. No. 10-2010-0043341, the contents of which are incorporated herein by reference in its entirety.

BACKGROUND OF THE INVENTION

1. Field of the Invention

The present invention relates generally to an apparatus and method for Read-Only Memory (ROM) update of a portable terminal. More particularly, the present invention relates to an apparatus and method for preventing a user from abnormally performing a ROM update process to intentionally disable a portable terminal.

2. Description of the Related Art

The use of portable terminals is rapidly increasing due to their portability and increased amount of functionality. Service providers (terminal manufacturers) are competitively developing mobile terminals with more convenient functions in order to attract more users.

For example, there are now portable terminals that provide various functions far in excess of simple voice communications, and now include functions such as a phone book, a game, a scheduler, a Short Message Service (SMS), a Multimedia Message Service (MMS), a Broadcast Message Service (BMS), an Internet service, electronic mail (e-mail) service, a wake-up call, a Motion Picture Expert Group (MPEG)-1 or MPEG-2 Audio Layer-3 (MP3) player, a digital camera, a Global Positioning System (GPS) and other similar products and services.

The portable terminals typically include a plurality of Read-Only Memories (ROMs corresponding to applications of communication companies, ROMs for communication functions, and ROMs for smart phone functions) for specific functions.

ROMs include information for performing the normal functions thereof. Manufacturers of portable terminals equip portable terminals with ROMs to release them.

However, when manufacturers of portable terminals attempt to add new functions or solve problems in existing functions by updating code, users of portable terminals are required to perform a ROM update process to add new information to ROMs.

The ROM update process may be performed by connecting the portable terminal to a separate communication apparatus using a data cable and then transmitting data to be updated.

When the portable terminal is disconnected from the communication apparatus during the ROM update process, there is a risk in that the portable terminal may not operate normally.

In this case, some users do not consider the consequences of disconnecting from the communication apparatus during the ROM update process. Moreover, even when a portable terminal is damaged by a user's fault, a user may unreasonably insist to a service center that the portable terminal abnormally operates due to unintentionally being disconnected during the ROM update and should be exchanged with new portable terminal.

Since the service center cannot determine whether the abnormal operation originates from the user's fault, manufacturers may incur unnecessary expenses for product exchange.

SUMMARY OF THE INVENTION

An exemplary aspect of the present invention is to substantially solve at least some of the above problems and/or disadvantages and to provide at least the advantages below. Accordingly, an exemplary aspect of the present invention is to provide an apparatus and method for preventing a user from intentionally disabling booting of a portable terminal.

Another exemplary aspect of the present invention is to provide an apparatus and method for determining whether a user has intentionally performed an abnormal or truncated Read-Only Memory (ROM) update in a portable terminal.

Another exemplary aspect of the present invention is to provide an apparatus and method for setting counter values according to the start and end of a ROM update process.

According to an exemplary aspect of the present invention, an apparatus for determining an abnormal ROM update in a portable terminal is provided. The apparatus preferably includes a ROM update unit for increasing a value of an update start counter when a ROM update process is performed, and increasing a value of an update finish counter when the ROM update process is finished.

According to another exemplary aspect of the present invention, a method for determining an abnormal ROM update in a portable terminal is provided. The method preferably includes increasing a value of an update start counter when a ROM update process is performed; and increasing a value of an update finish counter when the ROM update process is finished.

According to another exemplary aspect of the present invention, an apparatus for determining an abnormal ROM update in a portable terminal is provided. The apparatus preferably includes a control unit for performing a ROM update process for changing data stored in a ROM; a ROM update unit for performing the ROM update process and monitoring the update process; and a counter management unit for renewing (i.e. resetting) update counters according to a result of the monitoring of the ROM update unit.

Other exemplary aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above features and advantages of the present invention will become more apparent to a person of ordinary skill in the art from the following detailed description when taken in conjunction with the accompanying drawings in which.

DETAILED DESCRIPTION

The following description, with reference to the accompanying drawings, is provided to assist a person of ordinary skill in the art with a comprehensive understanding of certain exemplary embodiments of the invention provided herein for illustrative purposes. The description includes various specific details to assist a person of ordinary skill the art with understanding the claimed invention, but these details are to be regarded as merely exemplary. Accordingly, those of ordinary skill in the art will recognize that various changes and modifications of the illustrative examples described herein can be made without departing from the spirit of the invention and the scope of the appended claims. Further, for the purposes of clarity and simplicity, descriptions of well-known functions and constructions may be omitted as their inclusion may obscure appreciation of the subject matter of the claimed invention by a person of ordinary skill in the art.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustrative purposes only and is not to be construed as limiting the invention as defined by the appended claims and their equivalents.

It is to be understood that the singular forms "a," "an," and "the" include plural references unless the context clearly dictates otherwise. Thus, for example, a reference to "a component surface" includes reference to one or more of such surfaces.

By the term "substantially" it is typically meant that the recited characteristic, parameter, or value need not be achieved exactly, but that deviations or variations, including but in no way limited to, for example, tolerances, measurement error, measurement accuracy limitations and other factors known to persons of ordinary skill in the art, may occur in amounts that do not preclude the effect the characteristic was intended to provide.

The present invention provides an apparatus and method for determining whether a normal Read-Only Memory (ROM) update has been performed prior to abnormal operation of a portable terminal.

Figure 1:
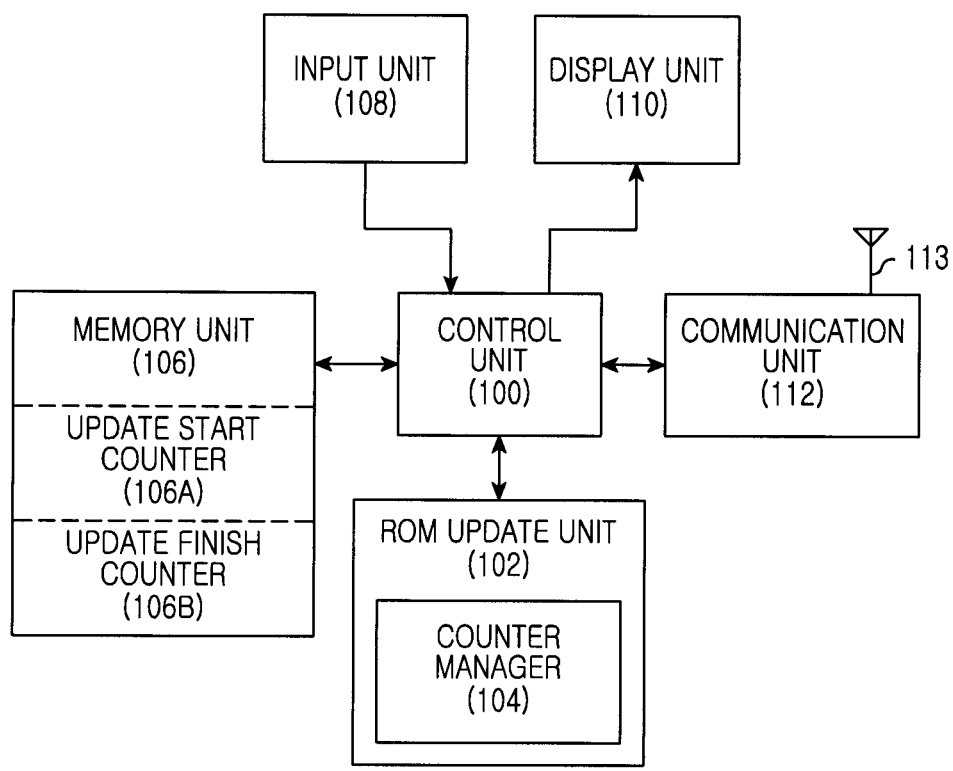
FIG. 1 is a block diagram of an apparatus for determining whether an abnormal operation is caused by a user's fault in a portable terminal according to an exemplary embodiment of the present invention.

FIG. 1 is a block diagram of an apparatus for determining whether an abnormal operation is caused by a user's mistake in a portable terminal according to an exemplary embodiment of the present invention.

Referring now to FIG. 1, the portable terminal preferably includes a control unit 100, a ROM update unit 102, a memory unit 106, an input unit 108, a display unit 110, and a communication unit 112. The ROM update unit 102 may also include a counter manager 104. The portable terminal may further include additional units that are not illustrated here merely for sake of clarity. Similarly, the functionality of two or more of the above units may be integrated into a single component.

The control unit 100 of the portable terminal controls an overall operation of the portable terminal. For example, the control unit 100 processes and controls voice communication and data communication. In addition to the general functions, according to the present invention, when a user performs update of data in ROM, the control unit 100 controls an update counter in an internal security area of the memory unit 106.

Here, the update counter includes an update start counter that is counted upon start of the Read Only Memory (ROM) update, and an update finish counter that is counted upon finish of the ROM update. When values of the two counters (update start counter 106(a) and update finish/complete counter (106(b)) are equal to each other, the control unit 100 may determine that the ROM update has been normally performed (i.e. successfully completed). However, when the values of the two counters (update start counter and update finish counter) are different from each other, the control unit 100 may determine that the ROM update was not successfully completed, and that the ROM update has been abnormally stopped before the ROM update process was finished.

The ROM update unit 102 increases the values of the two counters 106(a), 106(b) according to the ROM update process that is performed by a user under the control of the control unit 100.

When the ROM update starts, the ROM update unit 102 increases the value of the update start counter (106(a)), and when the ROM update is finished, the ROM update unit 102 increases the value of the update finish counter (106(b).

When entering debugging mode, the ROM update unit 102 loads the values of the two counters to determine whether the ROM update has been abnormally performed. An unequal value of the two counters would be considered to be an indication of abnormal performance.

The counter manager 104 of the ROM update unit 102 recognizes the start and end of the ROM update process, and then increases the values of the update start counter and the update finish counter to determine whether the ROM update has been abnormally performed, under the control of the ROM update unit 102. Alternatively, the present invention may increases the value of the update start counter prior to, during or after the start of the update, and thus, if the apparatus "hangs" or loses functionality, there is no update to the update finish counter. The unequal counter values can then be a basis to determine whether the user may have caused a fault by, for example, disconnecting a cable during the update, or powering the device down.

The memory unit preferably 106 includes a ROM, a Random Access Memory (RAM), a flash ROM, or other similar storage devices. The ROM stores various reference data and microcodes of a program for the process and control of the control unit 100 and the ROM update unit 102.

The RAM is a working memory of the control unit 100, which stores temporary data that are generated during the execution of various programs. The flash ROM stores various updatable data such as phone book, outgoing messages, and incoming messages.

The memory unit 106 stores the values of the update start counter 106(a) and the update finish counter (106(b), which are used to determine whether the ROM update is abnormally performed (i.e. the ROM update process is aborted or did not completely finish, or finished with errors.

The input unit 108 includes numeric keys of digits 0-9 and a plurality of function keys, such as a Menu key, a Cancel (Delete) key, a Confirmation key, a Talk key, an End key, an Internet connection key, Navigation keys (or Direction keys), character input keys, and other similar input keys and buttons. The input unit 112 provides the control unit 100 with key input data that corresponds to keys pressed by a user.

The display unit 110 preferably displays state information, a restricted number of characters, and a large amount of video and still images that are generated during the operation of the portable terminal. The display unit 110 may be a color Liquid Crystal Display (LCD), an Active Mode Organic Light Emitting Diode (AMOLED) display, and other similar display apparatuses. If the display unit 114 includes a touch input device and is applied to a touch input type portable terminal, it can be used as an input device, in lieu of or in addition to the input device 108.

The communication unit 112 transmits/receives Radio Frequency (RF) signals inputted/outputted through an antenna 113. For example, in transmitting (TX) mode, the communication unit 112 channel-encodes, spreads and RF-processes TX data prior to transmission. In receiving (RX) mode, the communication unit 112 converts a received RF signal into a baseband signal, and despreads and channel-decodes the baseband signal to restore the original data.

The control unit 100 of the portable terminal may be configured to perform the function of the ROM managing unit 102. Although separate units are provided for respective functions of the control unit 100, the control unit 100 may be configured to perform all or some of the functions on behalf of such separate units.

Figure 2:
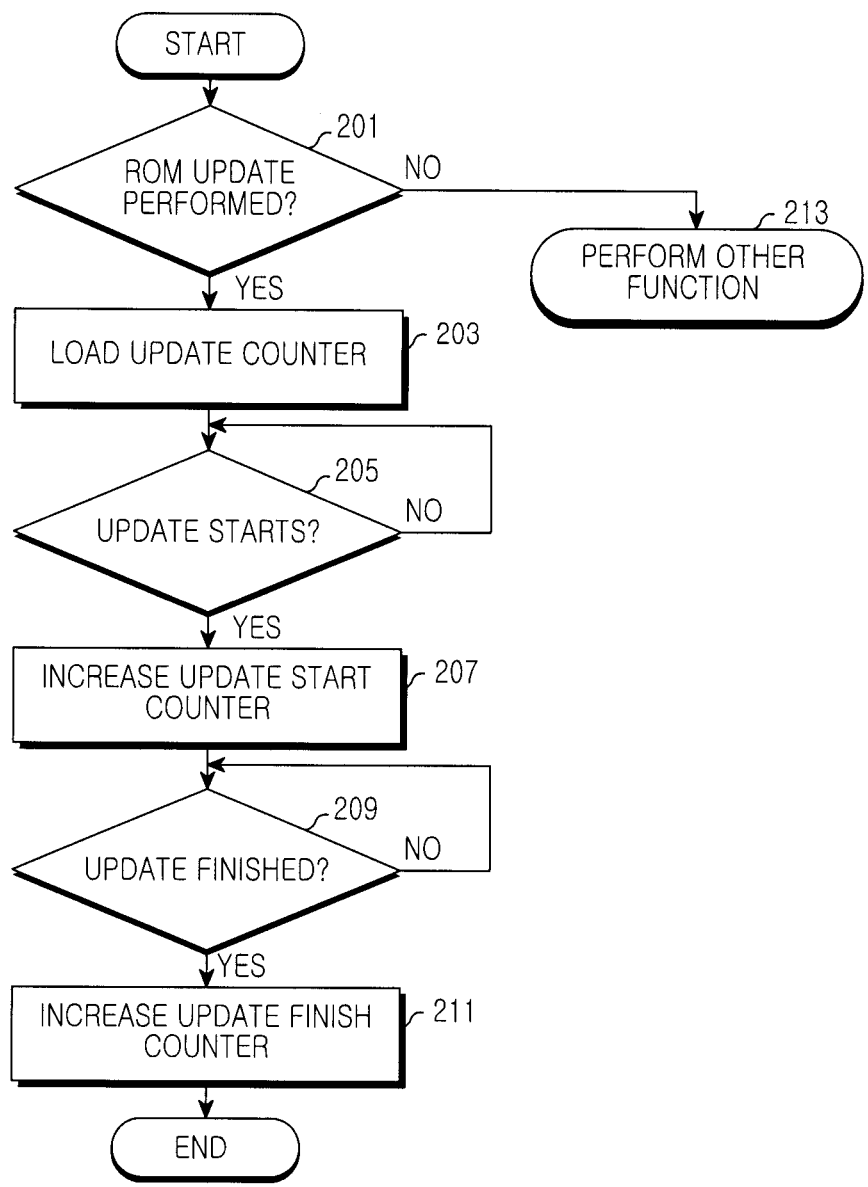
FIG. 2 is a flow diagram illustrating a process of counting a value of a counter used to determine whether a Read-Only Memory (ROM) update process has an abnormally performed in a portable terminal according to an exemplary embodiment of the present invention.

FIG. 2 is a flow diagram illustrating a process of counting a value of a counter used to determine whether a ROM update process was abnormally performed in a portable terminal according to an exemplary embodiment of the present invention.

Referring to FIG. 2, in step 201, the portable terminal determines whether an update to the ROM update process has been performed. This determination may be based over a predetermined time, or by other indicators.

The ROM update process comprises a process for updating data in a ROM area. The portable terminal may determine whether or an update mode for downloading updated data has been or is being performed.

When the ROM update process is not performed (in step 201), the portable terminal proceeds to perform step 213. In step 213, the portable terminal performs other function (e.g., idle mode).

On the other hand, when the ROM update process is performed (in step 201), the portable terminals proceeds to perform step 203. In step 203, the portable terminal loads values of update counters stored in an internal security area, and proceeds to perform step 205 to determine whether the ROM update process starts.

Here, the update counters include an update start counter (In Counter; IC 106(a)) that is counted upon start of the ROM update process, and an update finish counter (Finish Counter; FC 106(b)) that is counted upon finish of the ROM update process. The portable terminal determines the start of the ROM update process in step 205 to increase the value of the update start counter. Also, the values of the two counters may be initially set to "0" as a factory default value.

If the ROM update process does not start (in step 205), the portable terminal re-performs the process of step 205 to re-determine whether the ROM update process for increasing the value of the update start counter starts.

If the ROM update process starts (in step 205), the portable terminal proceeds to perform step 207 to increase the value of the update start counter that is counted according to the start of the ROM update process. For example, when a user of the portable terminal intends to perform the ROM update process for the first time after the portable terminal is released, the portable terminal increases the value of the update start counter from a default value "0" to "1" (IC=0→IC=1).

The portable terminal having increased the value of the update start counter proceeds to perform step 209. In step 209, the portable terminal determines whether the ROM update process performed in step 205 is finished.

If the ROM update process is not finished (in step 209), the portable terminal re-performs the process of step 209 to re-determine whether the update process for increasing the value of the update finish counter is finished.

On the other hand, if the ROM update process is finished (in step 209), the portable terminal proceeds to perform step 211. In step 211, the portable terminal increases the value of the update finish counter that is counted according to the finish of the ROM update process. For example, when a user of the portable terminal finishes the ROM update process for the first time after the portable terminal is released, the portable terminal increases the value of the update finish counter from a default value "0" to "1" (FC=0→FC=1).

In other words, when a user of the portable terminal performs a normal ROM update process, the portable terminal may recognize the value of the update start counter that is counted upon start of the ROM update process and the value of the update finish counter that is counted upon end of the ROM update process as the same value.

On the other hand, when the portable terminal performs an abnormal ROM update process (which can be caused by the user), the values of the update start counter and the update finish counter would have different count values when compared to each other.

Thus, the portable terminal may determine whether the ROM update process is normally performed, by comparing the values of the two counters.

Thereafter, the portable terminal finishes the algorithm.

Figure 3:
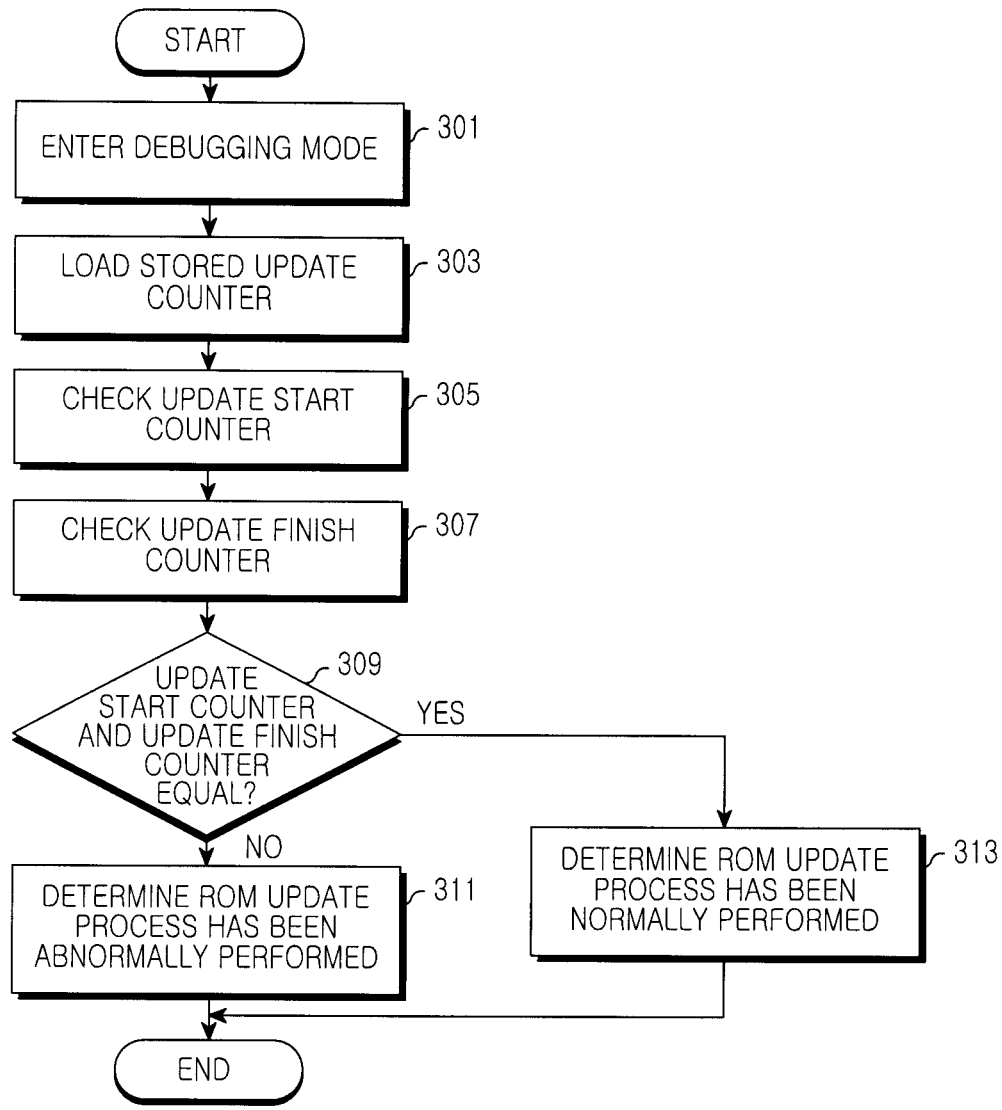
FIG. 3 is a flow diagram illustrating a process of determining whether a ROM update process has been abnormally performed in a portable terminal according to an exemplary embodiment of the present invention.

FIG. 3 is a flow diagram illustrating a process of determining whether a ROM update process has been abnormally performed in a portable terminal according to an exemplary embodiment of the present invention.

Referring now to FIG. 3, in step 301, the portable terminal determines whether it enters debugging mode. Here, the debugging mode detects a program error of the portable terminal and verifies the cause of the program error. In the present invention, the debugging mode refers to a mode for verifying the values of the ROM update counters of a portable terminal that is not booted or disconnected during the update process due to an ill-intention or negligence of a user.

In step 303, the portable terminal loads the values of the update counters stored in a security area of an internal memory, and then determines the value of the update start counter in step 305. Here, the value of the update start counter is a value that is counted when the ROM update process starts, and is used to determine how many times the ROM update process starts in the portable terminal.

In step 307, the portable terminal determines the value of the update finish counter from among the values of the counters that are loaded in step 303. Here, the value of the update finish counter is a value that is counted when the ROM update process is finished, and is used to determined how many times the ROM update process is finished in the portable terminal.

In step 309, the portable terminal determines whether the value of the update start counter determined in step 305 is equal to that of the update finish counter determined in step 307. Here, the equality between the values of the two counters means that the ROM update process has been performed without an abnormal interruption during the ROM update process.

On the other hand, a difference between the values of the two counters means that a user has intentionally or through negligence interfered with the ROM update process so as to cause an abnormal finish to the ROM update process that is not an updated counted value. In other words, after a user performs a ROM update process, the user may interrupt the ROM update process by disconnecting a cable connection before the ROM update process is normally completed to cause the apparatus to stop working or get errors.

If the values of the two counters are equal to each other (in step 309), the portable terminal proceeds to step 313. In step 313, the portable terminal may determine that a user has normally performed the ROM update process.

On the other hand, if the values of the two counters are different from each other (in step 309), the portable terminal proceeds to step 311. In step 311, the portable terminal may determine that a user has abnormally performed the ROM update process.

Thereafter, the portable terminal finishes the algorithm.

Figure 4:
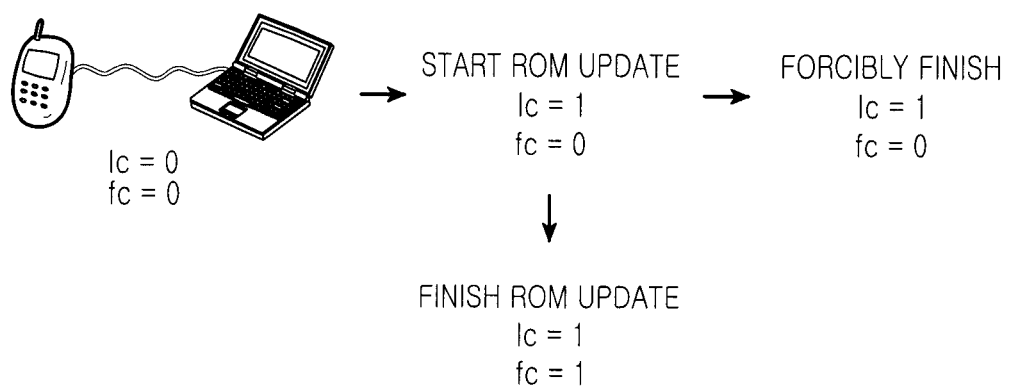
FIG. 4 is a diagram illustrating a process of counting a value of a counter in determining whether a ROM update process has been abnormally performed in a portable terminal according to an exemplary embodiment of the present invention.

FIG. 4 is a diagram illustrating a process of counting a value of a counter in determining whether a ROM update process is abnormally performed in a portable terminal according to an exemplary embodiment of the present invention.

An apparatus and method for determining whether a user has abnormally performed a ROM update process to intentionally disable a portable terminal not to be booted have been described with reference to FIG. 1 through 3.

When the apparatus and method for determining whether a ROM update process is normally performed are used, it is possible for a service center to prevent occurrence of service cost ill-intentionally generated by a user.

For example, when a user of the portable terminal abnormally interrupts the ROM update process by disconnecting a cable connection during the ROM update process, the portable terminal may not perform a booting process.

When the user of the portable terminal insists to a service center that the portable terminal is not booted due to a mechanical defect thereof, in the conventional apparatus it may be difficult or even impossible for the service center to determine whether or not the user has intentionally interrupted the ROM update process.

Thus, while a user may intentionally perform an abnormal operation, it is impossible for the service center to determine the present or absence of a fault of the user. Accordingly, the service center may suffer an economic loss by exchanging the portable terminal with a new one in spite of the fault of the user.

However, when the apparatus and method according to the embodiment of the present invention are used, the service center can determine the presence or absence of a user-created fault by determining the ROM update counter in debugging mode of a portable terminal that is intentionally allowed to abnormally operate by a user, and then determining whether the user has normally performed before the portable terminal abnormally operates.

Referring now to FIG. 4, the portable terminal may receive ROM data through a cable connection with a communication device to perform the ROM update process.

When the ROM update process is performed as described above, the portable terminal loads the ROM update counters, and then counts the values of the counters according to the start and end of the ROM update process.

When it is detected that the ROM update process starts in a situation (where the ROM update process is not performed) where both the values of the loaded update start counter and update finish counter are "0", the portable terminal counts only the value of the update start counter. The portable terminal counts the value of the update finish counter when the ROM update process is finished.

When the portable terminal performs the ROM update process and then normally finishes the ROM update process, the update start counter and the update finish counter have the same value, "1".

When the ROM update process is abnormally interrupted by a user during the ROM update process, the update start counter and the update finish counter have different values.

Thus, when the values of the two counters are loaded, a service center can determined whether the ROM update process has abnormally finished by a fault of a user.

In other words, as described above, when the values of the update start counter and the update finish counter are different from each other (IC=1, FC=0), the service center can determine that the ROM update process has not been performed before the portable terminal abnormally operates.

As described above, the present invention relates an apparatus and method for preventing a user from abnormally performing a ROM update process to intentionally disable a portable terminal. The present invention can prevent unnecessary service cost by setting values of counters according to the start and end of the ROM update process in the portable terminal, and comparing the values of the counters to determine whether the portable terminal abnormally operates due to a fault of a user.

The above-described methods according to the present invention can be realized in hardware or as software or computer code that can be stored in a recording medium such as a CD ROM, an RAM, a floppy disk, a hard disk, or a magneto-optical disk or downloaded over a network and stored on a non-transitory machine readable medium, so that the methods described herein can be rendered in such software using a general purpose computer, or a special processor or in programmable or dedicated hardware, such as an ASIC or FPGA. As would be understood in the art, the computer, the processor, microprocessor (controller/control unit) or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An apparatus for determining an abnormal Read Only Memory (ROM) update in a portable terminal, comprising:
    an update start counter for counting a quantity of times a ROM update process begins;
    an update finish counter for counting a quantity of times a ROM update process is finished; and
    a ROM update unit for increasing a value of the update start counter when a ROM update process begins, and increasing a value of the update finish counter when the ROM update process is finished,
    a controller configured for controlling commands and communications between at least the ROM update unit and update start counter and update finish counter, wherein, when the portable terminal abnormally operates, the controller controls a debugger in which the ROM update unit loads the values of the update start counter and the update finish counter, and in a debugging mode compares the loaded values of the update start counter and update finish counter in order to determine whether or not a user has intentionally disabled a portable terminal by booting or disconnection after a ROM update process begins.

2. The apparatus of claim 1, wherein the ROM update unit determines whether or not the values of the update start counter and update finish counter are equal to each other, and then, when the values of the update start counter and update finish counter are determined to be unequal to each other, the ROM update unit determines that a user has abnormally aborted the ROM update process during the ROM update process.

3. The apparatus of claim 1, wherein the ROM update unit determines whether or not the values of the update start counter and update finish counter are equal to each other, and then, when the values of the update start counter and update finish counter are equal to each other, determines that a user has normally finished the ROM update process.

4. A method for determining an abnormal Read Only Memory (ROM) update in a portable terminal, comprising:
    increasing by a ROM update unit a value of an update start counter when a ROM update process begins; and
    increasing by the ROM update unit a value of an update finish counter when the ROM update process is finished,
    when the portable terminal abnormally operates, then in a debugging mode loading the values of the update start counter and the update finish counter into a designated area of memory when the portable terminal abnormally operates;
    determining whether or not the ROM update process has been normally performed to completion prior to the portable terminal operating abnormally, by comparing the values of the update start counter and the update finish counter, and
    determining whether or not a user has intentionally disabled a portable terminal by booting or disconnection after a ROM update process begins.

5. The method of claim 4, wherein the update finish counter is updated only after a controller has determined that the ROM update process is successful.

6. The method of claim 4, wherein the determining of whether the ROM update process has been normally performed, comprises:
    determining whether or not the values of the update start counter and the update finish counter are equal to each other; and
    determining that a user has abnormally finished the ROM update process during the ROM update process when the values of the update start counter and the update finish counter are unequal to each other.

7. The method of claim 4, wherein the determining of whether the ROM update process has been normally performed, comprises:
    determining whether the values of the update start counter and the update finish counter are equal to each other; and
    determining that a user has normally finished the ROM update process during the ROM update process when the values of the update start counter and the update finish counters are equal to each other.

8. An apparatus for determining an abnormal ROM update in a portable terminal, comprising:
    a control unit for controlling a ROM update process for changing data stored in a ROM;
    a ROM update unit for performing the ROM update process and monitoring the update process; and
    a counter management unit for renewing update counters according to a result of the monitoring of the ROM update unit,
    wherein the ROM update unit updates an update start counter when the ROM update process begins and updates an update finish counter when the ROM update process is finished, and loads the update counters when entering debugging mode to determine whether or not a user has intentionally disabled a portable terminal by booting or disconnection after a ROM update process begins.

9. The apparatus of claim 8, wherein the ROM update unit determines that the ROM update process has been normally performed when values of the update start counter and the update finish counter are equal to each other, and determines that the ROM update process has been abnormally performed when the values of the update start counter and the update finish counter are unequal to each other.

10. The apparatus of claim 9, wherein abnormally performing the ROM update process comprises terminating the ROM update process before receiving an indication that the update is completed.

11. The apparatus of claim 9, wherein abnormally performing the ROM update process comprises terminating the ROM update process prior to completion.

* * * * *